(12) United States Patent
Kuo

(10) Patent No.: US 8,797,006 B2
(45) Date of Patent: Aug. 5, 2014

(54) HIGH-EFFICIENCY BIAS VOLTAGE GENERATING CIRCUIT

(71) Applicant: Silergy Semiconductor Technology (Hangzhou) Ltd, Hangzhou (CN)

(72) Inventor: Hsu Hung Kuo, Hangzhou (CN)

(73) Assignee: Silergy Semiconductor Technology (Hangzhou) Ltd, Hangzhou (CN)

( * ) Notice: Subject to any disclaimer, the term of this patent is extended or adjusted under 35 U.S.C. 154(b) by 0 days.

(21) Appl. No.: 13/960,945

(22) Filed: Aug. 7, 2013

(65) Prior Publication Data

US 2014/0056047 A1    Feb. 27, 2014

(30) Foreign Application Priority Data

Aug. 23, 2012  (CN) .......................... 2012 1 0301935

(51) Int. Cl.
*G05F 1/00* (2006.01)
*H02M 7/06* (2006.01)

(52) U.S. Cl.
CPC .................................. *H02M 7/066* (2013.01)
USPC ........................................................ 323/222

(58) Field of Classification Search
USPC ................... 323/222–227, 271–277
See application file for complete search history.

(56) References Cited

U.S. PATENT DOCUMENTS

| | | | | |
|---|---|---|---|---|
| 3,958,546 A * | 5/1976 | Ohki et al. | ..................... | 123/650 |
| 4,652,713 A * | 3/1987 | Omori et al. | .................. | 219/661 |
| 4,660,135 A * | 4/1987 | Lee | .............................. | 363/21.04 |
| 5,278,748 A * | 1/1994 | Kitajima | ..................... | 363/21.02 |
| 5,283,654 A * | 2/1994 | Cho | .............................. | 348/730 |
| 5,386,326 A * | 1/1995 | Harman | .......................... | 360/66 |
| 5,430,278 A * | 7/1995 | Krieg et al. | .................... | 235/449 |
| 5,592,367 A * | 1/1997 | Sugimori et al. | ................ | 363/17 |
| 5,615,098 A * | 3/1997 | Ishii et al. | ........................ | 363/84 |
| 5,731,967 A * | 3/1998 | Gruning | ........................... | 363/57 |
| 5,962,981 A * | 10/1999 | Okude et al. | ................... | 315/128 |
| 5,990,668 A * | 11/1999 | Coleman | ........................ | 323/271 |
| 6,094,038 A * | 7/2000 | Lethellier | ....................... | 323/282 |
| 6,178,100 B1 * | 1/2001 | Kitano | ............................ | 363/19 |
| 6,518,681 B2 * | 2/2003 | Ogino | .......................... | 310/12.12 |
| 7,436,164 B2 * | 10/2008 | Vos | ................................. | 323/293 |
| 8,319,376 B2 * | 11/2012 | Kitamura et al. | .............. | 307/104 |
| 2003/0006738 A1 * | 1/2003 | Duff, Jr. | ......................... | 320/166 |
| 2003/0035311 A1 * | 2/2003 | Phadke | ........................... | 363/89 |
| 2005/0052579 A1 * | 3/2005 | Yamamoto | ..................... | 348/736 |
| 2005/0286271 A1 * | 12/2005 | Vinciarelli | ....................... | 363/17 |
| 2007/0247270 A1 * | 10/2007 | Fushimi et al. | ................ | 336/212 |
| 2007/0262816 A1 * | 11/2007 | Kashiwa et al. | .............. | 330/136 |
| 2008/0031025 A1 * | 2/2008 | Wang | .............................. | 363/78 |
| 2008/0204126 A1 * | 8/2008 | Wang et al. | .................... | 327/551 |

(Continued)

*Primary Examiner* — Timothy J Dole
*Assistant Examiner* — Yusef Ahmed
(74) *Attorney, Agent, or Firm* — Michael C. Stephens, Jr.

(57) ABSTRACT

Disclosed are bias voltage generating circuits and methods for a switching power supply. In one embodiment, a switching power supply can include: (i) a driver circuit configured to receive a bias voltage, and to drive a switch in a power stage of the switching power supply; (ii) where a ratio of an output voltage of the switching power supply to an expected bias voltage of the driver circuit is configured as a proportionality coefficient; (iii) a bias voltage generating circuit configured to generate the bias voltage for the driver circuit based on a first voltage; and (iv) an H-shaped inductor coupled to an input of the bias voltage generating circuit, where the first voltage is configured to be generated based on a number of turns of the H-shaped inductor and the proportionality coefficient.

17 Claims, 9 Drawing Sheets

(56) References Cited

U.S. PATENT DOCUMENTS

| | | | |
|---|---|---|---|
| 2009/0016087 A1* | 1/2009 | Shimizu | 363/89 |
| 2009/0084369 A1* | 4/2009 | Idogawa et al. | 123/634 |
| 2009/0174484 A1* | 7/2009 | Yamamoto et al. | 330/284 |
| 2009/0267576 A1* | 10/2009 | Orr | 323/259 |
| 2010/0244796 A1* | 9/2010 | Chen et al. | 323/282 |
| 2011/0001601 A1* | 1/2011 | Lo | 336/212 |
| 2011/0133711 A1* | 6/2011 | Murakami et al. | 323/282 |
| 2011/0221402 A1* | 9/2011 | Park et al. | 323/211 |
| 2011/0260844 A1* | 10/2011 | Abe et al. | 340/426.1 |
| 2012/0155127 A1* | 6/2012 | Brokaw | 363/49 |
| 2013/0002512 A1* | 1/2013 | Leighton | 343/867 |
| 2013/0178252 A1* | 7/2013 | Sorias et al. | 455/573 |
| 2013/0234621 A1* | 9/2013 | Athalye | 315/307 |
| 2013/0271096 A1* | 10/2013 | Inagaki | 323/271 |

* cited by examiner

HIGH-EFFICIENCY BIAS VOLTAGE GENERATING CIRCUIT

RELATED APPLICATIONS

This application claims the benefit of Chinese Patent Application No. 201210301935.4, filed on Aug. 23, 2012, which is incorporated herein by reference in its entirety.

FIELD OF THE INVENTION

The present invention relates to the field of a switching power supply, and more particularly to a high-efficiency bias voltage generating circuit.

BACKGROUND

During operation of a switching power supply, an input AC voltage can be converted into a DC output signal to supply a load. This conversion can be performed through switching operations of a power switch in a power stage circuit of the switching power supply. The power switch can be driven by a driver circuit, and the driver circuit may utilize an appropriate bias voltage to control the power switch.

SUMMARY

In one embodiment, a switching power supply can include: (i) a driver circuit configured to receive a bias voltage, and to drive a switch in a power stage of the switching power supply; (ii) where a ratio of an output voltage of the switching power supply to an expected bias voltage of the driver circuit is configured as a proportionality coefficient; (iii) a bias voltage generating circuit configured to generate the bias voltage for the driver circuit based on a first voltage; and (iv) an H-shaped inductor coupled to an input of the bias voltage generating circuit, where the first voltage is configured to be generated based on a number of turns of the H-shaped inductor and the proportionality coefficient.

Embodiments of the present invention can provide several advantages over conventional approaches, as may become readily apparent from the detailed description of preferred embodiments below.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
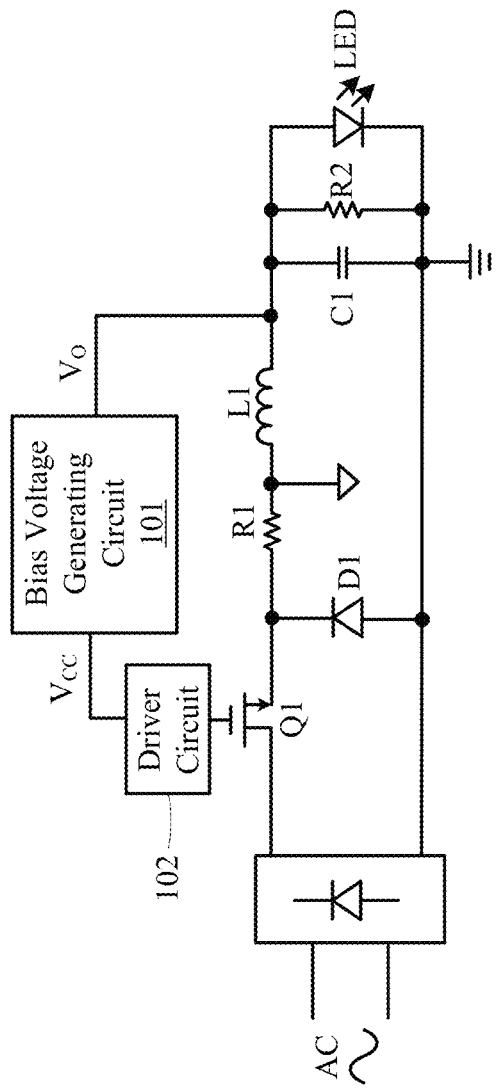
FIG. 1 shows a schematic block diagram of an example voltage converter through a bias voltage generating circuit.

Referring now to FIG. 1, shown is a schematic block diagram of an example voltage converter through a bias voltage generating circuit. In this example, the power supply can absorb energy from an output terminal of the switching power supply to be a bias voltage for driver circuit 102. However, an output terminal voltage of a switching power supply may be much higher than a bias voltage desired by the driver circuit. Thus, an appropriate voltage converter may be utilized to reduce the output terminal voltage to an applicable voltage range for biasing the driver circuit. In this example, the power stage circuit may be a buck topology, and can include inductor L1. Bias voltage generating circuit 101 can receive output terminal voltage $V_O$ of the switching power supply, and may generate bias voltage $V_{CC}$ for driver circuit 102 through a conversion process.

Figure 2:
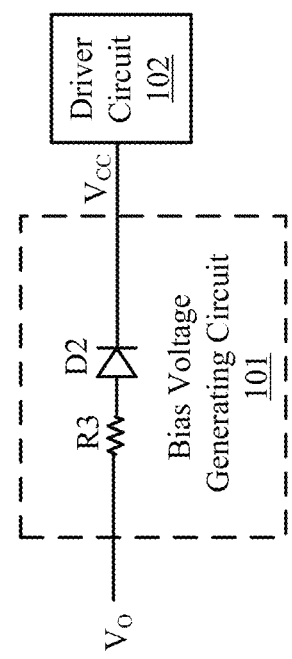
FIG. 2 shows a first example implementation of the bias voltage generating circuit of FIG. 1.

Bias voltage generating circuit 101 can be realized by using one of a variety of implementations. For example, FIG. 2 shows one example implementation of the bias voltage generating circuit in FIG. 1. In this example, bias voltage generating circuit 101 can utilize a step-down process through resistor R3 and diode D2. Resistor R3 can be used to divide voltage so as to convert output voltage $V_O$ to bias voltage $V_{CC}$, and to maintain bias voltage $V_{CC}$ at an appropriate value. However, resistor R3 may be relatively high resistance because output voltage $V_O$ can be relatively high. As a result, power losses may be relatively high, and conversion efficiency may be relatively low in this implementation.

Figure 3:
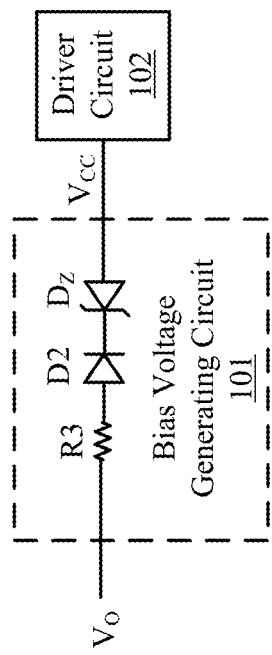
FIG. 3 shows a second example implementation of the bias voltage generating circuit of FIG. 1.

Referring now to FIG. 3, shown is a second example implementation of the bias voltage generating circuit in FIG. 1. In this example, bias voltage generating circuit 101 can include resistor R3, diode D2, and zener diode $D_Z$. Zener diode $D_Z$ can be utilized to convert output voltage $V_O$ to bias voltage $V_{CC}$, such that bias voltage $V_{CC}$ can be maintained at an appropriate value. However, this implementation utilizes a high-performance zener diode, which may be designed to meet the particular voltage range requirements of bias voltage $V_{CC}$.

Figure 4:
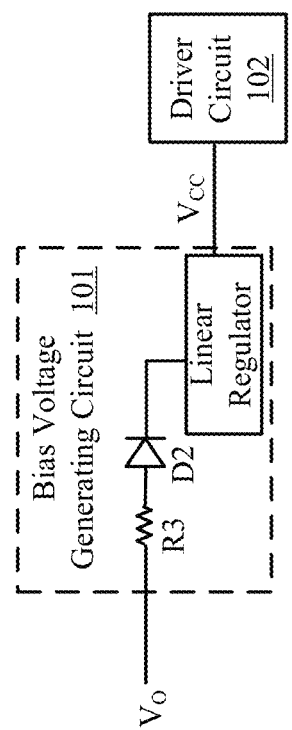
FIG. 4 shows a third example implementation of the bias voltage generating circuit of FIG. 1.

Referring now to FIG. 4, shown is a third example implementation of the bias voltage generating circuit in FIG. 1. Here, bias voltage generating circuit 101 can include resistor R3, diode D2, and a linear regulator (e.g., a low-dropout [LDO] regulator). The linear regulator LDO may be utilized to regulate output voltage $V_O$ and to further convert $V_O$ to suitable bias voltage $V_{CC}$. In this example the linear regulator may be configured as a separate regulating device, which can result in relatively high product costs, large circuit volume, and low conversion efficiency.

In particular embodiments, a bias voltage generating circuit can achieve flexible voltage conversion with relatively low costs and high efficiency. In one embodiment, a switching power supply can include: (i) a driver circuit configured to receive a bias voltage, and to drive a switch in a power stage of the switching power supply; (ii) where a ratio of an output voltage of the switching power supply to an expected bias voltage of the driver circuit is configured as a proportionality coefficient; (iii) a bias voltage generating circuit configured to generate the bias voltage for the driver circuit based on a first voltage; and (iv) an H-shaped inductor coupled to an input of the bias voltage generating circuit, where the first voltage is configured to be generated based on a number of turns of the H-shaped inductor and the proportionality coefficient.

Figure 5:
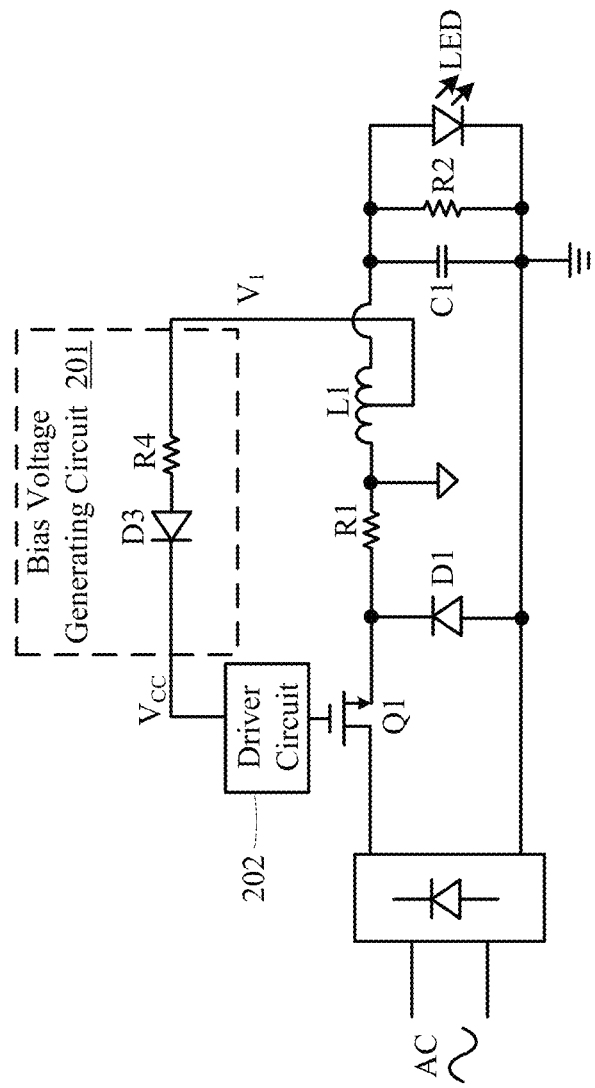
FIG. 5 shows a schematic block diagram of a first example bias voltage generating circuit in accordance with embodiments of the present invention.

Referring now to FIG. 5, shown is a schematic block diagram of a first example bias voltage generating circuit in accordance with embodiments of the present invention. In this example, bias voltage generating circuit 201 can be utilized in a switching power supply. The switching power supply can include a power stage circuit, bias voltage generating circuit 201, and driver circuit 202, where the power stage circuit can include H-shaped inductor L1. Bias voltage generating circuit 201 can connect to H-shaped inductor L1 in the power stage circuit to provide bias voltage $V_{CC}$ for driver circuit 202. Driver circuit 202 can receive bias voltage $V_{CC}$, and may control a switching operation of power switch Q1 in the power stage circuit, so as to drive a load (e.g., a light-emitting diode [LED]). In this example, the power stage circuit may be a buck topology; however, power stages in particular embodiments can be any suitable apology (e.g., a boost topology, a buck-boost topology, a single-ended primary-inductor converter [SEPIC] topology, etc.).

The switching power supply can convert an AC voltage (e.g., received from a power grid) into a DC output voltage to supply a load (e.g., an LED). Thus, the DC output voltage may be a substantially constant value. Driver circuit 202 in the switching power supply may receive bias voltage $V_{CC}$. For example, the bias voltage may be a supply voltage for driver circuit 202. Also, driver circuit 202 may have expected bias voltage that is a predetermined value. For example, driver circuit 202 may be enabled or configured for operation when the bias voltage meets or exceeds the expected bias voltage. In addition, a ratio of the output voltage of the switching power supply to the expected bias voltage of the driver circuit may be a constant value, which may be denoted as proportionality coefficient K.

In this particular example, H-shaped inductor L1 may have a center tap that is connected to bias voltage generating circuit 201 to obtain voltage $V_1$. For example, a location of the center tap may be determined by a number of turns of H-shaped inductor L1 and proportionality coefficient K. In particular embodiments, voltage $V_1$ may be generated in various ways based on different types of H-shaped inductors. Further, the switching power supply can operate in a variety of modes, such as a floating-driving mode.

Figure 6:
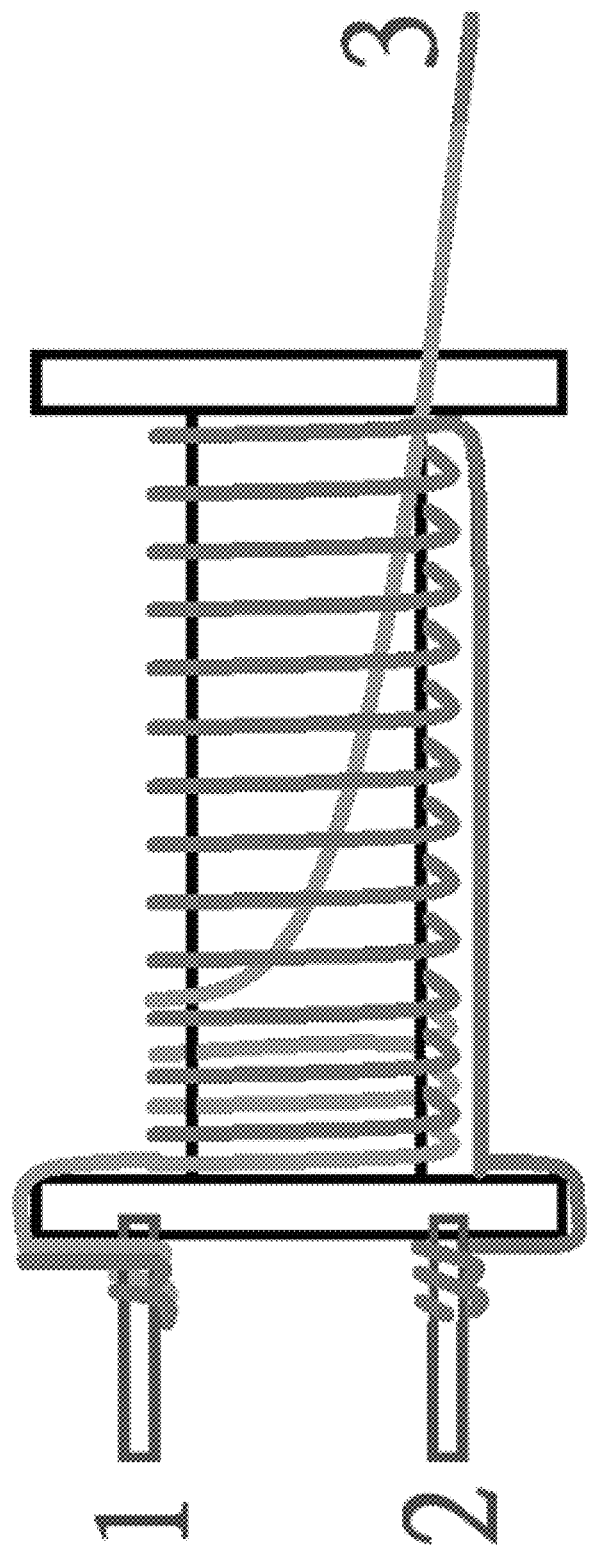
FIG. 6 shows a diagram of an example H-shaped inductor with two pins in accordance with embodiments of the present invention.

Referring now to FIG. 6, shown is a diagram of an example H-shaped inductor with two pins in accordance with embodiments of the present invention. In this example, the two pins may be labeled 1 and 2. The two pins may be located at a same terminal, or two terminals (e.g., input and output terminals) of the magnetic core of H-shaped inductor L1. As described herein with respect to H-shaped inductors, a "pin" may be a physical connection point (e.g., pins 1 and 2), and a "terminal" may be an electrical connection to the inductor (e.g., via a wire connected to pin 1, a wire connected to pin 2, and free wire 3). For example, a pin may be an external connection point from a package (e.g., an integrated circuit [IC] package), or an input/output output point from a circuit (e.g., on chip or IC) module or portion. For example, terminals can be coincident with left and right sides of the inductor, such as to form the "H" shape. Also, a terminal can be a wire connection to the inductor, and such wire connections may be "lead out" by way of a pin (e.g., at a fixed location) or a free terminal.

In particular embodiments, the terminals of the H-shaped inductor can be mapped to the various pins in any suitable way. In this example, two pins of H-shaped inductor L1 may be located at the same terminal or side of the magnetic core of H-shaped inductor L1. Two terminals of H-shaped inductor L1 may be lead out by the two pins 1 and 2, and the center tap may be free terminal 3. Specifically, the coil may be winding from free terminal 3 of the center tap to pin 1 of H-shaped inductor L1, and then from pin 1 to pin 2. Also, the coil from pin 1 to pin 2 may cover the coil from the center tap to pin 1, to fix the position of the coil from the center tap to pin 1.

If a number of turns of H-shaped inductor L1 in the power stage circuit is N, then the number of turns of coil from pin 1 to pin 2 is N. If the number of turns of the coil from the center tap to pin 1 is N×(1/K), due to the voltage drop of diode D3 (see, e.g., bias voltage generating circuit 201), the number of turns of the coil from the center tap to pin 1 can be increased accordingly. Based on a direct proportionality relationship between the number of turns of the coil and the voltage, voltage $V_1$ obtained at the center tap can be slightly higher than 1/K of the input voltage of the switching power supply. Therefore, voltage $V_1$ can be higher than the expected bias voltage of the driver circuit 202. In this particular example, voltage $V_1$ may be a sum of the expected bias voltage of the driver circuit 202 and the voltage drop of diode D3.

Figure 7:
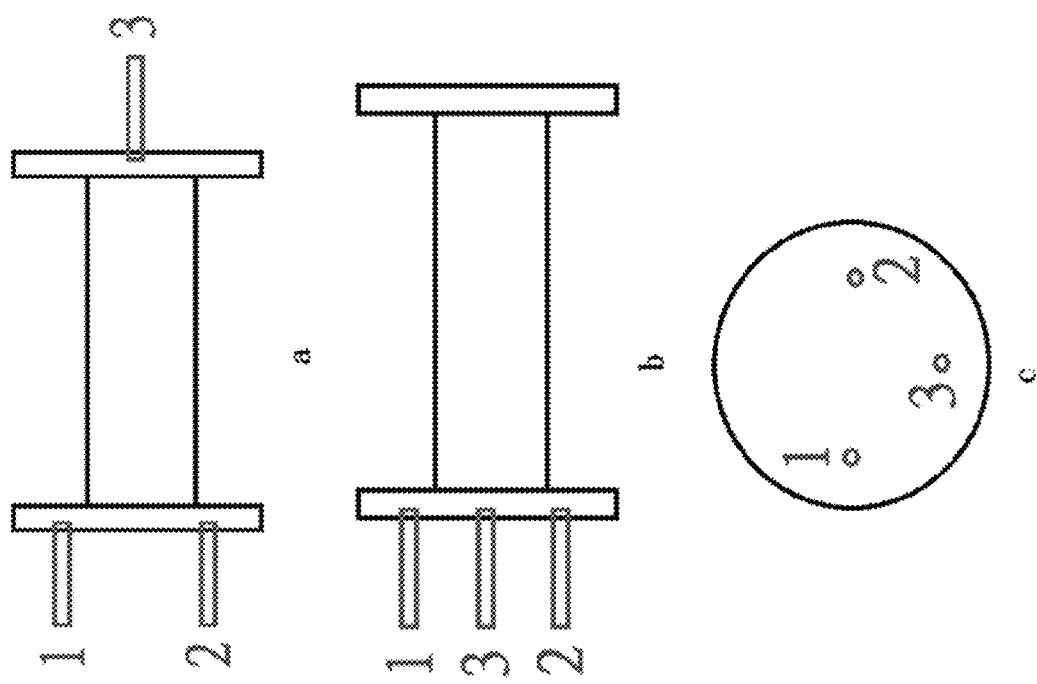
FIG. 7 shows a diagram of an H-shaped inductor with three pins in accordance with embodiments of the present invention.

Referring to FIG. 7, shown is a diagram of an example H-shaped inductor with three pins in accordance with embodiments of the present invention. The three pins (1, 2, and 3) may be located at a same terminal or side, or two terminals or sides of the H-shaped inductor L1, as shown. Two terminals of the H-shaped inductor L1 may be lead out by two pins 1 and 2, and the center tap may be lead out by pin 3. In this case, pins 1, 2, and 3 can be freely arranged in any suitable arrangement. In FIG. 7, diagram "a" shows three pins located at two terminals (pins 1 and 2 on the left side, and pin 3 on the right side) of the magnetic core of the H-shaped inductor. Diagram "b" shows three pins located at the same (left side) terminal of the magnetic core of the H-shaped inductor. Diagram "c" shows a cross-sectional view of the H-shaped inductor with three pins, allowing for external connection to the inductor.

The coil may be winding from pin 1 to pin 2, and the center tap can be lead out from the windings that are from pin 1 to pin 2. In the same way, if the number of turns of H-shaped inductor L1 in the power stage circuit is N, the number of turns of the coil from pin 1 to pin 2 may be N. For example, the position of the center tap can be arranged to make the number of turns of the coil from pin 1 to the center tap N×(1/K). The number of turns of the coil from the center tap to pin 1 can be increased such that that voltage $V_1$ can be slightly higher than an expected bias voltage of the driver circuit 202. For example, voltage $V_1$ can be set to be the sum of the expected bias voltage of driver circuit 202 and the voltage drop of diode D3.

Bias voltage generating circuit 201 can include resistor R4 and diode D3. A first terminal of resistor R4 can connect to the center tap of H-shaped inductor L1 to receive voltage $V_1$. A second terminal of resistor R4 can connect to the anode of diode D3. The cathode of diode D3 can connect to driver circuit 202 to provide bias voltage $V_{CC}$ for driver circuit 202. In this example, voltage $V_1$ may correspond to the expected bias voltage of the driver circuit 202. Without any dividing resistance, resistor R4 can be a relatively small resistance with low losses and high efficiency, and diode D3 can be used for preventing current reflow of driver circuit 202. In this way, bias generation circuits of particular embodiments can obtain a suitable voltage from the H-shaped inductor according to the expected bias voltage, and without using any voltage conversion, so as to reduce power losses and improve conversion efficiency.

Figure 8:
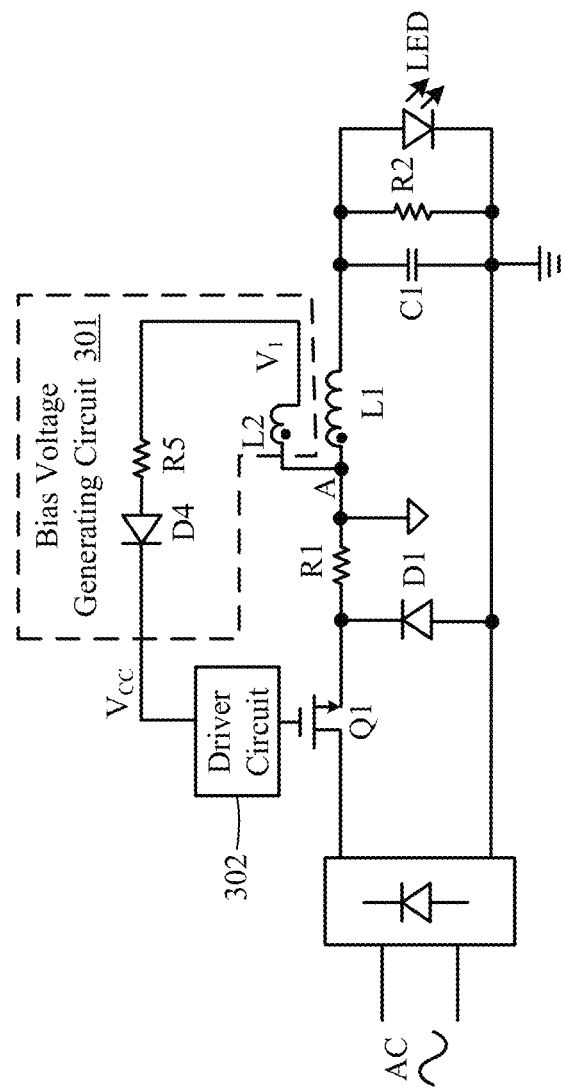
FIG. 8 shows a circuit diagram of a second example bias voltage generating circuit in accordance with embodiments of the present invention.

Referring to FIG. 8, shown is a schematic block diagram of a second example bias voltage generating circuit in accordance with embodiments of the present invention. In this particular example, the power stage circuit of the switching power supply may be similar to that in the first example, so it will not be described here again. Also, the relationship between the output voltage of the switching power supply and the expected bias voltage of driver circuit 302 may be similar to that in the example of FIG. 5.

In the example of FIG. 8, bias voltage generating circuit 301 can include auxiliary winding L2, resistor R5 and diode D4. A first terminal of auxiliary winding L2 can connect to a first terminal (e.g., an input terminal) of H-shaped inductor L1, and a second terminal auxiliary winding L2 can connect to a first terminal of resistor R5, to generate voltage $V_1$. For example, the number of turns of auxiliary winding L2 can be determined by the number of turns of H-shaped inductor L1 and the proportionality coefficient.

Voltage $V_1$ can be obtained in a variety of ways according to types of H-shaped inductor L1. The types of H-shaped inductor L1 can also be a type with two pins or a type with three pins, as discussed above. In another example, H-shaped inductor L1 can contain four pins. When H-shaped inductor L1 has two pins, two terminals of H-shaped inductor L1 may be lead out by the two pins. In this example, in order to reduce chip volume into facilitate integration, auxiliary winding L2 and the windings of H-shaped inductor L1 may share one magnetic core. The following with three pins or four pins may also be the same. For example, a first terminal (e.g., an input terminal) of auxiliary winding L2 can connect to a pin at a first terminal (e.g., an input terminal) of H-shaped inductor L1, and a second terminal of auxiliary winding L2 can be a free terminal.

In addition, a coil of H-shaped inductor L1 can cover the coil of auxiliary windings L2 to fix a coil position of auxiliary windings L2. Similarly, if the number of turns of H-shaped inductor L1 in the power stage circuit is N, the number of turns of auxiliary winding L2 can be N×(1/K). For example, in accordance with the bias voltage generating circuit 301 as shown in FIG. 8, due to the voltage drop of diode D4, the number of turns of auxiliary windings L2 can be increased. Thus, voltage $V_1$ obtained from the center tap can be slightly higher than 1/K of the input voltage of the switching power supply. So, voltage $V_1$ can be slightly higher than expected bias voltage of the driver circuit 302. For example, a suitable number of turns of auxiliary winding L2 can be arranged so as to make voltage $V_1$ be a sum of the expected bias voltage of the driver circuit 302 and the voltage drop of diode D4.

When H-shaped inductor L1 has three pins, two terminals of H-shaped inductor L1 may be lead out by two of the three pins. A first terminal (e.g., an input terminal) of auxiliary winding L2 can connect to a pin of a first terminal (e.g., an input terminal) of H-shaped inductor L1, and a second terminal can be lead out by pin 3. The turns of the auxiliary winding L2 can be set to be similar to that discussed above with two pins, such that a voltage $V_1$ that is slightly (e.g., greater than a predetermined amount, such as 2%, 5%, etc.) higher than the expected bias voltage of driver circuit 302 can be obtained.

Figure 9:
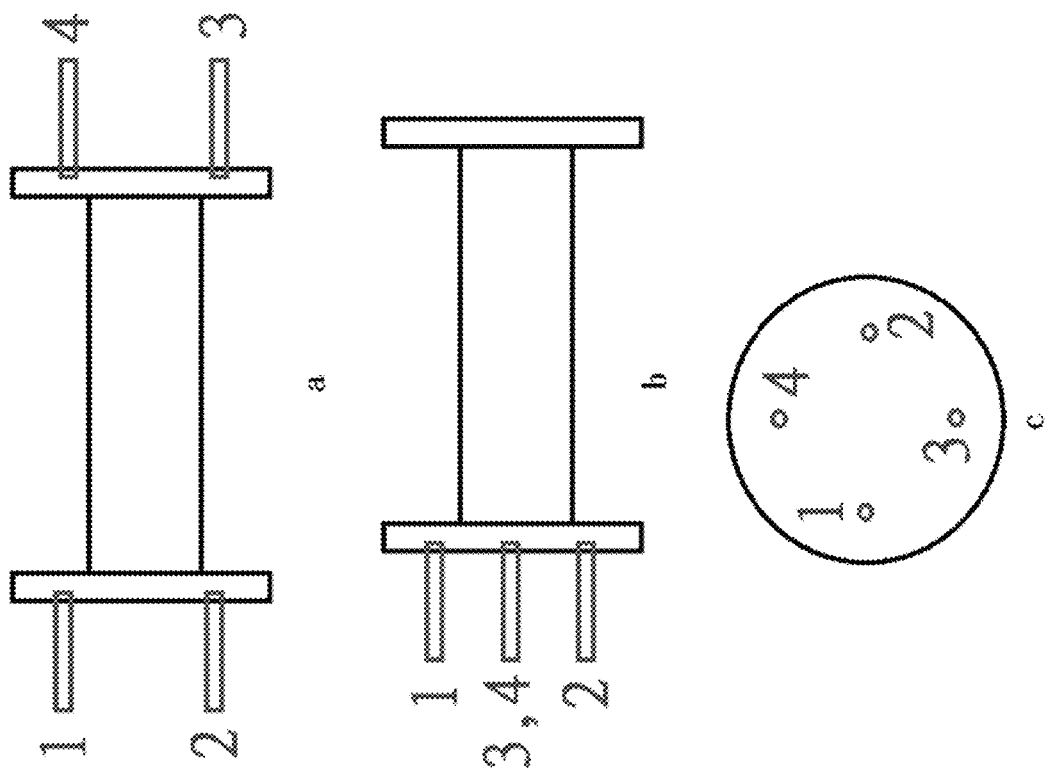
FIG. 9 shows a diagram of an H-shaped inductor with four pins in accordance with embodiments of the present invention.

Referring now to FIG. 9, shown is a schematic diagram of an example H-shaped inductor L1 with four pins in accordance with embodiments of the present invention. The four pins can be located as pairs at each of the two terminals, or all four at the same (e.g., left side) terminal of the magnetic core of H-shaped inductor L1. In FIG. 9, diagram "a" shows four pins located at two terminals of the magnetic core of H-shaped inductor L1, and diagram "b" shows four pins located at the same (left side) terminal of the magnetic core of H-shaped inductor L1. Diagram "c" shows a cross-sectional view of H-shaped inductor L1 with four pins. Two terminals of the H-shaped inductor L1 can be lead out by two pins 1 and 3, and two terminals of auxiliary winding L2 can be lead out by other two pins 2 and 4. In addition, a pin at the first terminal (e.g., an input terminal) of H-shaped inductor L1, and a pin at the first terminal (e.g., in input terminal) of auxiliary winding L2 can be connected to a same node A in the power stage circuit (see, e.g., FIG. 8).

When four pins are located at a same terminal, in order to facilitate the connection, pin 3 at the input terminal of H-shaped inductor L1 can connect to pin 4 at an input or left side terminal of auxiliary winding L2, and also can connect to the power stage circuit, as shown in "b" of FIG. 9. Similarly, the number of turns of the auxiliary winding may be 1/K of the number N, which is the number of turns of H-shaped inductor L1. For example, the number of turns of auxiliary winding L2 can be increased to obtain voltage $V_1$ that is slightly (e.g., 2%, 5%, etc.) higher than an expected bias voltage of driver circuit 302. In one case, voltage $V_1$ can be set to be the sum of the expected bias voltage of the driver circuit 302 and the voltage drop of diode D4.

By using one of the various types of the H-shaped inductors and connection modes of the auxiliary winding, voltage $V_1$ can be obtained without use of a complicated transformer structure. In this way, the production process may be simplified, and associated product costs can be reduced. In addition, users can select an appropriate H-shaped inductor and pin arrangements based on the particular bias generation and/or switching power supply applications.

In FIG. 8, a first terminal of resistor R5 can connect to the auxiliary winding L2 to receive voltage $V_1$, and a second terminal of resistor R5 can connect to an anode of diode D4. A cathode of diode D4 can connect to driver circuit 302 to provide bias voltage $V_{CC}$ for driver circuit 302. This example may thus utilize an auxiliary-winding approach to obtain a suitable voltage from an H-shaped inductor according to an expected bias voltage, but without any voltage conversion, so as to reduce losses and improve overall conversion efficiency.

In this way, a suitable voltage can be obtained through a ratio of an output terminal voltage of a switching power supply to an expected bias voltage of a driver circuit and turns of an H-shaped inductor. A bias voltage for the driver circuit can then be generated according to the suitable voltage. Bias voltage generation in particular embodiments may not utilize any relatively complex voltage drop conversion of the suitable voltage in order to generate the bias voltage requirements for the driver circuit, thus potentially reducing costs and increasing conversion efficiency.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A switching power supply, comprising:
   a) a driver circuit configured to receive a bias voltage, and to drive a gate of a power transistor in a power stage of said switching power supply;
   b) said driver circuit being enabled when said bias voltage is at least as high as an expected bias voltage, wherein a ratio of an output voltage of said switching power supply to said expected bias voltage of said driver circuit is configured as a proportionality coefficient;
   c) a bias voltage generating circuit configured to generate said bias voltage for said driver circuit based on a first voltage, wherein said bias voltage generating circuit comprises a first diode having an anode coupled to a first resistor, and a cathode coupled to said driver circuit and configured as said bias voltage; and
   d) an H-shaped inductor directly connected by a center tap thereof to an input of said bias voltage generating circuit at said first resistor, wherein a voltage at said center tap is configured as said first voltage, and wherein a location of said center tap is determined by a number of turns of said H-shaped inductor and said proportionality coefficient.

2. The switching power supply of claim 1, wherein said bias voltage generating circuit comprises:
   a) an auxiliary winding connected to said H-shaped inductor, wherein a number of turns of said auxiliary winding is determined by said number of turns of said H-shaped inductor and said proportionality coefficient;
   b) a second resistor connected to said auxiliary winding and configured as said first voltage; and
   c) a second diode connected to said second resistor, and to said driver circuit to provide said bias voltage.

3. The switching power supply of claim 2, wherein:
   a) said H-shaped inductor comprises two pins, said two pins being located at one or more terminals of a magnetic core of said H-shaped inductor;
   b) two terminals of said H-shaped inductor are lead out through said two pins, a first terminal of said auxiliary winding is connected to a pin at a first terminal of said H-shaped inductor, and a second terminal of said auxiliary winding is a free terminal; and
   c) a coil of said H-shaped inductor surrounding an outside of said auxiliary winding is configured to fix a coil position of said auxiliary winding.

4. The switching power supply of claim 2, wherein:
   a) said H-shaped inductor comprises three pins, said three pins being located at one or more terminals of a magnetic core of said H-shaped inductor; and
   b) two terminals of said H-shaped inductor are lead out through two pins of said three pins, a first terminal of said auxiliary windings is coupled to a pin at a first terminal of said H-shaped inductor, and a second terminal is lead out by a third pin of said three pins.

5. The switching power supply of claim 2, wherein:
   a) said H-shaped inductor comprises four pins, said four pins being located at one or more terminals of a magnetic core of said H-shaped inductor;
   b) two terminals of said H-shaped inductor are lead out through two pin of said four pins, and two terminals of said auxiliary windings are lead out by two other pins of said four pins; and
   c) terminals of said H-shaped inductor and said auxiliary winding are coupled to a same node in said power stage.

6. The switching power supply of claim 1, wherein:
   d) said H-shaped inductor comprises two pins, said two pins being located at one or more terminals of a magnetic core of said H-shaped inductor; and
   e) said one or more terminals of said H-shaped inductor are lead out through said two pins, and said center tap is a free terminal.

7. The switching power supply of claim 1, wherein:
   g) said H-shaped inductor comprises three pins, said three pins being located at one or more terminals of a magnetic core of said H-shaped inductor; and
   h) said one or more terminals of said H-shaped inductor are lead out through two of said three pins, and said center tap is lead out by a third of said three pins.

8. The switching power supply of claim 1, wherein said power stage comprises a buck converter topology.

9. The switching power supply of claim 1, wherein said power stage comprises a boost converter topology.

10. The switching power supply of claim 1, wherein said power stage comprises a buck-boost converter topology.

11. The switching power supply of claim 1, wherein said power stage comprises a single-ended primary-inductor converter (SEPIC) topology.

12. The switching power supply of claim 1, wherein said first voltage is higher than said expected bias voltage.

13. The switching power supply of claim 1, wherein said first voltage is 2% higher than said expected bias voltage.

14. The switching power supply of claim 1, wherein said first voltage is 5% higher than said expected bias voltage.

15. The switching power supply of claim 1, wherein said first voltage comprises a sum of said expected bias voltage and a voltage drop across a diode.

16. The switching power supply of claim 1, wherein said first voltage is higher than an inverse of said proportionality coefficient.

17. The switching power supply of claim 1, being configured to operate in a floating-driving mode.

* * * * *